United States Patent [19]

Hlavka

[11] 3,954,973

[45] May 4, 1976

[54] ALKYLATED DERIVATIVES OF ANTIBIOTIC AV290

[75] Inventor: Joseph John Hlavka, Tuxedo, N.Y.

[73] Assignee: American Cyanamid Company, Stamford, Conn.

[22] Filed: Jan. 3, 1975

[21] Appl. No.: 538,629

Related U.S. Application Data

[63] Continuation-in-part of Ser. No. 409,506, Oct. 25, 1973, abandoned, which is a continuation-in-part of Ser. No. 259,188, June 2, 1972, abandoned.

[52] U.S. Cl.................................. 424/118; 424/116
[51] Int. Cl.$^2$......................................... A61K 35/00
[58] Field of Search........................... 424/118, 116

Primary Examiner—Jerome D. Goldberg
Attorney, Agent, or Firm—Edward A. Conroy, Jr.

[57] ABSTRACT

This disclosure describes a novel series of active antibacterial agents derived by reaction of antibiotic AV290 with certain classes of alkyl halides.

3 Claims, 4 Drawing Figures

ALKYLATED DERIVATIVES OF ANTIBIOTIC AV290

CROSS REFERENCE TO RELATED APPLICATION

This application is a continuation-in-part of my abandoned application Ser. No. 409,506, filed Oct. 25, 1973, which in turn is a continuation-in-part of my abandoned application Ser. No. 259,188, filed June 2, 1972.

BRIEF SUMMARY OF THE INVENTION

This invention relates to a novel group of antibiotics and, more particularly, is concerned with a novel series of active antibacterial agents derived by reaction of antibiotic AV290 with an alkyl halide of the formula: R—X wherein X is chloro, bromo or iodo and R is lower alkyl, lower alkenyl, hydroxy lower alkyl, lower alkoxy lower alkyl, chloro lower alkyl, benzyl or a moiety of the formula:

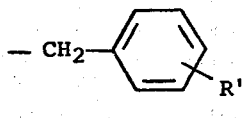

wherein R' is methyl, ethyl, methoxy, ethoxy, chloro, bromo, iodo, cyano, nitro, nitroso, carbomethoxy or carbethoxy. The lower alkyl, lower alkenyl, and lower alkoxy groups contemplated by the present invention are those having up to four carbon atoms.

DETAILED DESCRIPTION OF THE INVENTION

Figure 1:
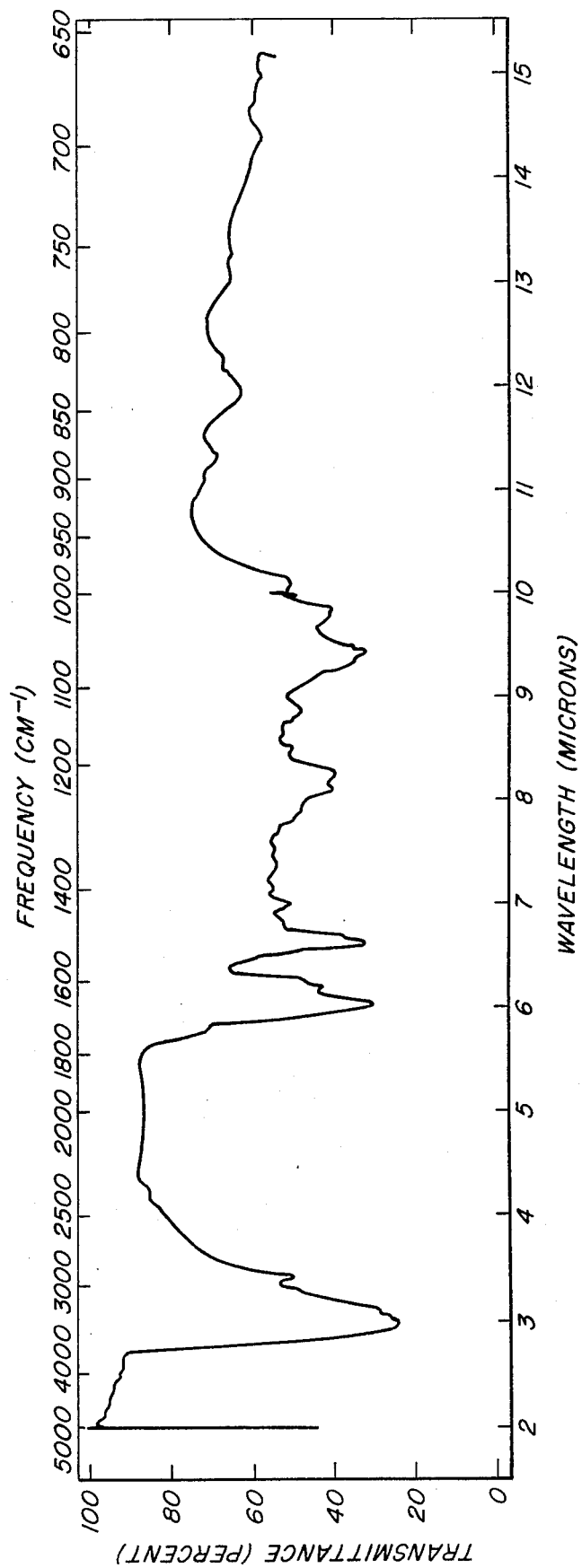

Antibiotic AV290 is formed by fermentative biosynthesis during the cultivation under controlled conditions of *Streptomyces candidus* NRRL 3218 and mutants thereof. The preparation and properties of antibiotic AV290 are set forth in U.S. Pat. No. 3,338,786 which is hereby incorporated by reference.

In accordance with the present invention, I have discovered that it is possible to prepare highly useful antibacterial agents by reaction of antibiotic AV290 with certain alkyl halides. The novel antibacterial agents of this invention are, in general, crystalline solids of relatively limited solubility in non-polar solvents such as diethyl ether and hexane, but considerably more soluble in solvents such as water, lower alkanols, acetone, and the like.

Suitable lower alkyl halides contemplated by the present invention are, for example, methyl iodide, ethyl bromide, n-propyl chloride, n-butyl iodide, sec-butyl bromide, tert-butyl chloride, and the like. Useful lower alkenyl halides are for example, allyl iodide, pseudoallyl bromide, propenyl chloride, 1-butenyl iodide, crotyl bromide, iso-butenyl chloride, etc. Typical hydroxy lower alkyl halides may be α-methyl-β-hydroxyethyl iodide, β-hydroxypropyl bromide, γ-hydroxypropyl chloride, β-methyl-γ-hydroxypropyl iodide, ω-hydroxybutyl bromide, β-hydroxybutyl chloride, and the like. Appropriate lower alkoxy lower alkyl halides are, for example, β-isobutoxyethyl iodide, γ-isopropoxypropyl bromide, α-methyl-β-n-propoxyethyl chloride, ω-methoxybutyl iodide, β-methyl-γ-ethoxypropyl bromide, α-methyl-γ-ethoxypropyl chloride, etc. Suitable chloro lower alkyl halides may be β-chloroethyl iodide, γ-chloropropyl bromide, β-methyl-γ-chloropropyl chloride ω-chlorobutyl iodide, and the like. Useful benzyl and substituted benzyl halides contemplated by the present invention are, for example, benzyl iodide, o-methyl-α-bromotoluene, m-ethyl-α-chlorotoluene, p-methoxy-α-iodotoluene, o-ethoxy-α-bromotoluene, m-chloro-α-chlorotoluene, p-bromo-α-iodotoluene, o-iodo-α-bromotoluene, m-nitroso-α-chlorotoluene, p-cyano-α-iodotoluene, o-nitro-α-bromotoluene, m-carbomethoxy-α-chlorotoluene, p-carbethoxy-α-iodotoluene, and the like.

The structure of the reaction products of antibiotic AV290 with the stated alkyl halides is unknown at the present and, accordingly, these products are defined as the reaction products of the stated alkyl halides with antibiotic AV290. It is thought likely from the behavior of the novel antibiotics of this invention that for the most part the reaction product of antibiotic AV290 and a single alkyl halide is alkylated on at least two nitrogen atoms. These products can then be converted to salts of different strong acids, e.g., sulfates, phosphates, trifluoroacetates, etc.

It is an advantage of this invention that the novel reaction products may be prepared for the most part in simple reaction media. Ordinarily, water or lower alkanols are used as a reaction medium, but other solvents such as methyl cellosolve or dimethylformamide and the like, or mixtures thereof, can also be used. Typically, antibiotic AV290 is dissolved in a suitable solvent or mixture of solvents, and at least an equal weight of alkyl halide is added to the solution. The reaction solution is either stored at room temperature overnight in the case of combination solvents (i.e., water-methyl cellosolve-methanol) or refluxed from 4 to 24 hours in the case of lower alkanols. After the alkylation is completed or largely completed, the reaction solution is vacuum evaporated to a small volume and poured into a non-polar solvent such as diethyl ether or hexane whereupon the product precipitates. The product may then be purified by conventional means such as crystallization, partition chromatography, and the like.

The novel antibiotics of this invention have broad-spectrum activity against a number of microorganisms and thus are useful antibacterial agents. The antibiotics show in vitro activity in standard, scientifically recognized microbiological assays, against the following organisms:

*Klebsiella pneumoniae* "A" strain AD
*Bacillus cereus* ATCC 10702
*Mycobacterium smegmatis* ATCC 607
*Streptococcus pyogenes* β hemolytic
*Escherichia coli* ATCC 9637
*Salmonella gallinarum*
*Staphylococcus aureus* ATCC 6538
*Pseudomonas aeruginosa* ATCC 10145
*Streptococcus faecalis*
*Staphylococcus albus* No. 69
*Streptococcus sp.* β hemolytic No. 80
*Staphylococcus aureus* NY 104
*Corynebacterium xerosa*
*Streptococcus sp.* α hemolytic
*Escherichia coli* No. 22
*Bacillus subtilis* ATCC 6633
*Alcaligenes faecalis* ATCC 10153
*Proteus vulgaris* ATCC 9484
*Sarcina lutea* ATCC 9341

The novel antibiotics of this invention are active against gram-positive microorganisms. These novel compounds are thus potentially useful as therapeutic agents in treating bacterial infections in humans and animals caused by such microorganisms, and as animal feed supplements. The compounds can be usefully employed for controlling such infections by topical application or internal administration. The usefulness of the novel compounds is also demonstrated by their ability to control systemic lethal infections in mice. Thus the novel antibiotics of this invention show very high antibacterial in vivo activity in mice against *Staphylococcus aureus*, strain Smith, *Diplococcus pneumoniae*, and *Streptococcus pyogenes*. Although the novel antibiotics of this invention have not as yet been clinically demonostrated to be useful in human therapy, the conditions of the tests in mice against human pathogens shows a high probability of useful activity in humans.

The invention will be described in greater detail in conjunction with the following specific examples.

EXAMPLE 1

Reaction of methyl bromide with antibiotic AV290

Methyl bromide is bubbled into a solution of 1.5 g. of antibiotic AV290 (free base) in 30 ml. of water, 50 ml. of methyl cellosolve, and 8 ml. of methanol for 20 minutes. The solution is stored in a closed container overnight. The solution is evaporated to dryness. The residue is dissolved in a small amount of methanol and poured into 100 ml. of diethyl ether. The product is recovered yielding 1.4 gm. Microanalysis (percent): C, 45.96; H, 5.00; N, 5.29; Cl, 3.08; Br, 9.53. A standard infrared absorption spectrum of the product prepared in a KBr pellet is shown in FIG. 1 of the accompanying drawings.

EXAMPLE 2

Reaction of methyl iodide with antibiotic AV290

Figure 2:
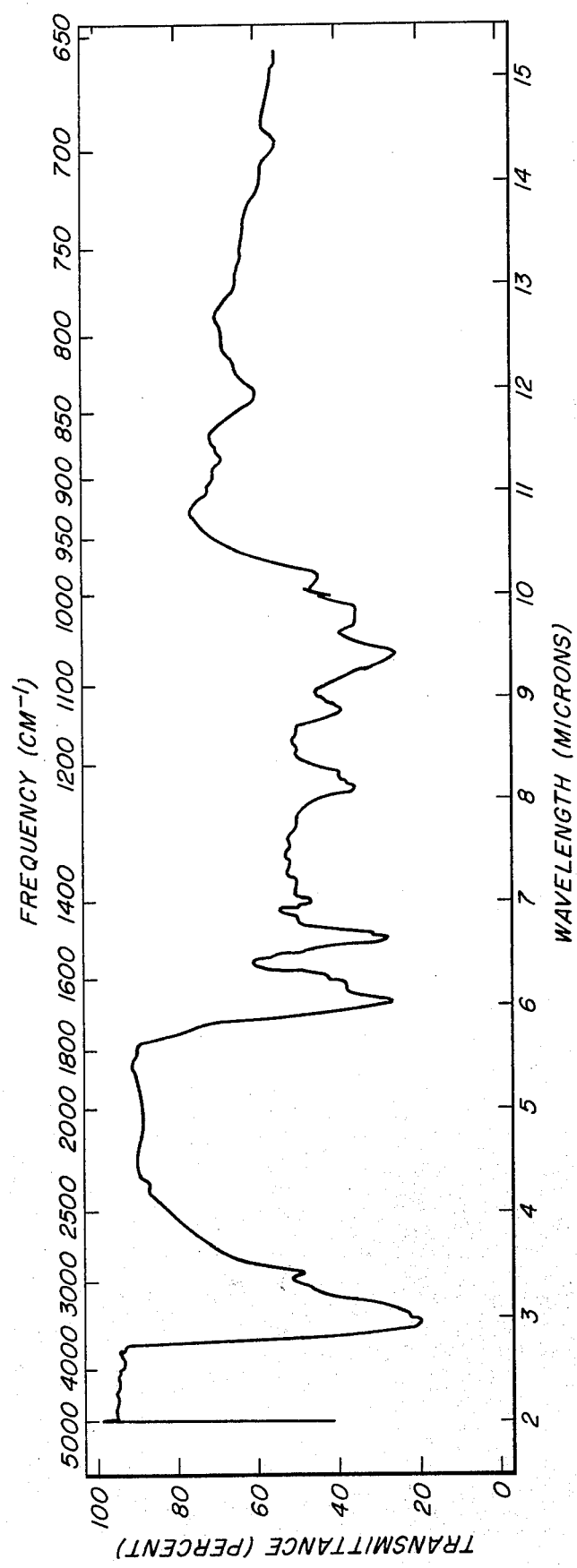

To a solution of 5.0 g. of antibiotic AV290 (free base) in 107 ml. of water and 125 ml. of methyl cellosolve was slowly added (over a 10 minute period) 25 ml. of methyl iodide in 25 ml. of methyl alcohol. The mixture was stirred at room temperature overnight and evaporated to dryness in vacuo. The residue was dissolved in 10 ml. of methanol and poured into 300 ml. of diethyl ether. The solid that separated was filtered, washed (3 × 50 ml.) with acetone, and dried; yield, 5.0 g. Microanalysis (percent): C, 45.20; H, 4.86; N, 5.42; Cl, 3.46; I, 15.08. A standard infrared absorption spectrum of the product prepared in a KBr pellet is shown in FIG. 2 of the accompanying drawings.

EXAMPLE 3

Reaction of ethyl iodide with antibiotic AV290

Figure 3:
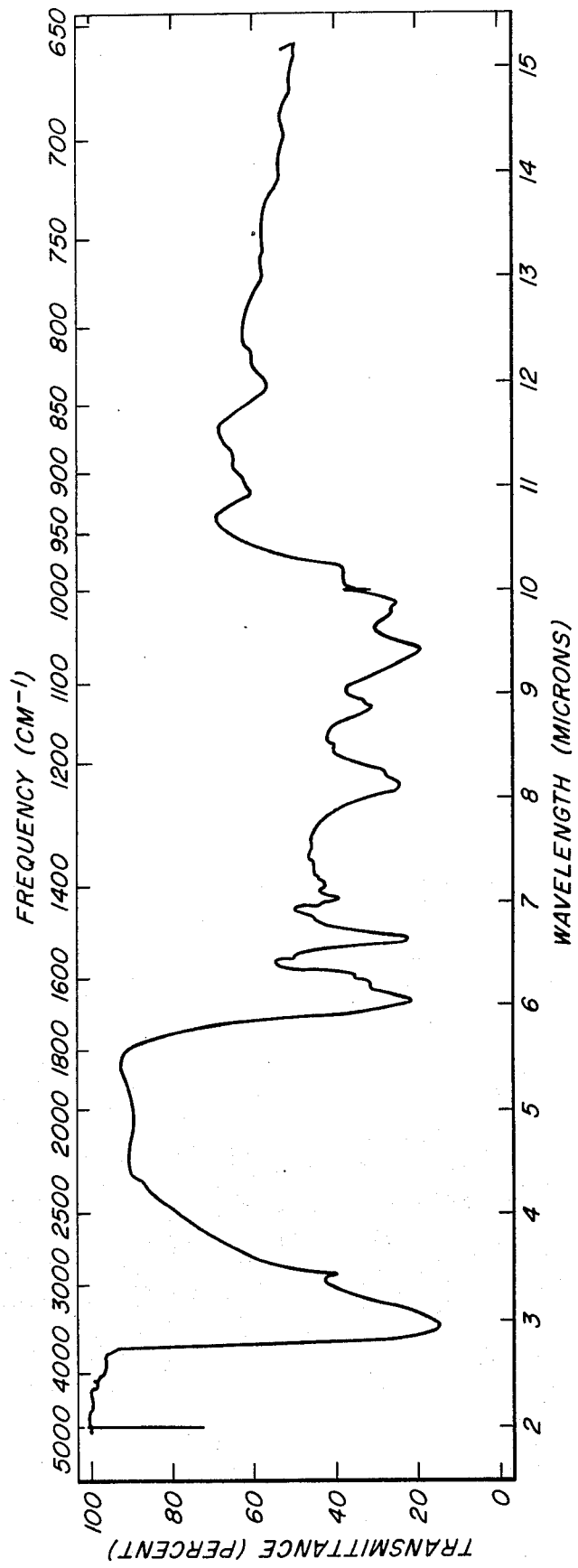

A mixture of 200 mg. of antibiotic AV290 (free base) and 1 ml. of ethyl iodide in 50 ml. of ethanol is heated at reflux for 2½ hours. The solution is evaporated to a small volume and poured into 100 ml. of diethyl ether. The product is recovered yielding 200 mg. Microanalysis (percent): C, 35.43; H, 3.88; N, 4.33; Cl, 3.30; I, 10.67. A standard infrared absorption spectrum of the product prepared in a KBr pellet is shown in FIG. 3 of the accompanying drawings.

EXAMPLE 4

Reaction of m-nitrobenzyl bromide with antibiotic AV290

Figure 4:
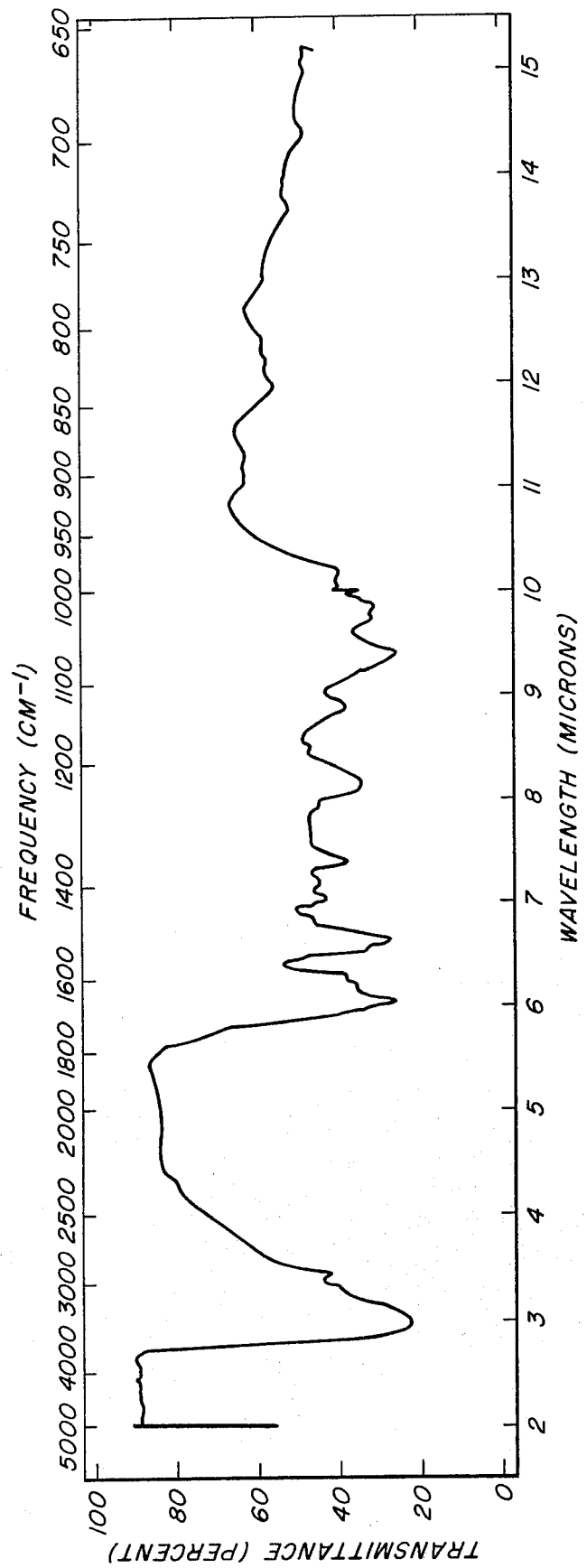

A mixture of 200 mg. of antibiotic AV290 (free base) and 200 mg. of m-nitrobenzyl bromide in 50 ml. of ethyl alcohol is heated at reflux for 4 hours. The solid that remains is removed by filtration and the filtrate is evaporated in vacuo to a small volume and poured into 100 ml. of diethyl ether. The product is recovered yielding 70 mg. Microanalysis (percent): C, 43.40; H, 4.74; N, 5.55; Cl, 3.57; Br, 8.69. A standard infrared absorption spectrum of the product prepared in a KBr pellet is shown in FIG. 4 of the accompanying drawings.

EXAMPLE 5

General procedure for preparation of alkylated derivatives of antibiotic AV290

A mixture of 200 mg. of AV290 free base and 2 ml. (or grams) of the alkyl halide in 2 ml. of ethanol is heated at reflux for a period of from 4 to 24 hours. The solution is evaporated to a small volume and poured into diethyl ether. The precipitated solid is filtered and dried.

This procedure is employed using the series of reagents listed in Table I below wherein is set forth the composite in vitro activity of the products expressed in terms of the in vitro activity of antibiotic AV290 as unity. The in vitro activities of the products were determined by the agar-dilution streak-plate technique against the standard laboratory microorganisms listed hereinabove. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the bacterial test cultures. The standard sterile nutrient agar solutions containing the different dilutions of the test compounds, along with suitable and comparable control dilutions containing no test compound, are then allowed to cool in Petri dishes thereby forming solidified agar plates. The test bacteria are prepared for use by growing in broth overnight. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of bacterial growth is noted. The minimal inhibitory concentration (expressed in micrograms per milliliter) is defined as the concentration of test compound causing complete inhibition of growth of any particular organism.

Also set forth in Table I below are the $R_f$ values of the products as determined by thin layer chromatography in 60/40 n-propanol/water. In this system, antibiotic AV290 has an $R_f$ value of 0.02.

TABLE I

| Reagent | In vitro activity | $R_f$ Value |
|---|---|---|
| Benzyl bromide | 1.8 | 0.80 |
| m-Nitro-α-bromotoluene | 1.4 | 0.80 |
| Ethyl bromide | 1.4 | 0.84 |
| m-Cyano-α-bromotoluene | 1.8 | 0.75 |
| β-Bromoethyl alcohol | 1.5 | 0.82 |
| 3-Methylpropyl iodide | 1.0 | 0.65 |
| β-Iodoethyl alcohol | 1.0 | 0.71 |
| Propyl iodide | 0.7 | 0.84 |
| 3-Butenyl bromide | 1.6 | 0.85 |
| Isobutyl bromide | 1.5 | 0.83 |
| β-Chloroethyl bromide | 1.0 | 0.9 |
| α-Bromo-m-nitrotoluene | 1.6 | 0.79 |
| Methoxymethyl chloride | 1.0 | 0.90 |
| Ethyl iodide | 0.8 | 0.80 |
| Isopropyl iodide | 0.7 | 0.84 |

TABLE I-continued

| Reagent | In vitro activity | $R_f$ Value |
|---|---|---|
| Allyl bromide | 0.3 | 0.68 |

In Table II below is set forth the in vivo activity of the product of the present invention prepared from antibiotic AV290 and methyl iodide against *Staphylococcus aureus*, strain Smith, *Streptococcus pyogenes*, and *Diplococcus pneumoniae* in mice. This new substance shows high in vivo antibacterial activity against these bacteria when administered by a single subcutaneous dose to groups of Carworth Farms CF-1 mice, weight about 20 gm., infected intraperitoneally with a lethal dose of these bacteria in $10^{-3}$, $10^{-5}$, and $10^{-6}$ trypticase soy broth dilutions, respectively, of a 5 hour TSP blood culture. The in vivo activity of antibiotic AV290 in the same test is also set forth in Table II for comparison.

TABLE II

*Staphylococcus aureus* Smith ATCC 13709

| Single subcutaneous dose in mg./kg. of body weight | Alive/Total Mice Tested, 7 days after infection | |
|---|---|---|
| | Antibiotic AV290 | AV290+Methyl iodide |
| 20 | 5/5 | 5/5 |
| 10 | 5/5 | 5/5 |
| 5 | 4/5 | 5/5 |
| 2.5 | 1/5 | 4/5 |
| 1.2 | 2/5 | 0/5 |
| 0.6 | 0/5 | 1/5 |
| Infected nontreated controls | 20/20 Mice died within four days after infection | |

*Diplococcus pneumoniae* SV1

| Single subcutaneous dose in mg./kg. of body weight | Alive/Total Mice Tested, 14 days after infection | |
|---|---|---|
| | Antibiotic AV290 | AV290+Methyl iodide |
| 5 | 20/20 | 10/10 |
| 2.5 | 19/20 | 10/10 |
| 1.2 | 3/20 | 20/20 |
| 0.6 | 0/20 | 20/20 |
| 0.3 | 0/10 | 2/20 |
| 0.15 | | 0/10 |
| Infected nontreated controls | 39/40 Mice died within three days after infection | |

*Streptococcus pyogenes* C-203

| Single subcutaneous dose in mg./kg. of body weight | Alive/Total Mice Tested, 14 days after infection | |
|---|---|---|
| | Antibiotic AV290 | AV290+Methyl iodide |
| 10 | 19/20 | 10/10 |
| 5 | 19/20 | 10/10 |
| 2.5 | 15/20 | 20/20 |
| 1.2 | 3/20 | 20/20 |
| 0.6 | 0/20 | 11/20 |
| 0.3 | | 0/2 |
| Infected nontreated controls | 79/80 Mice died within three days after infection | |

In Table III below is set forth the in vivo activity of the products of the present invention prepared from ethyl bromide, ethyl iodide, and m-nitrobenzyl bromide against *Staphylococcus aureus* Smith ATCC 13709 in mice. These new substances show high in vivo antibacterial activity against this bacterium when adminsistered by a single subcutaneous dose to groups of Carworth Farms CF-1 mice, weight about 20 gm., infected intraperitoneally with a lethal dose of this bacterium in a $10^{-3}$ trypticase soy broth dilution of a 5 hour TSP blood culture. The in vivo activity of antibiotic AV290 in the same test is also set forth in Table III for comparison.

TABLE III

| Single Subcutaneous dose in mg./kg. of body weight | Alive/Total Mice Tested, 7 days after infection | |
|---|---|---|
| | Antibiotic AV290 | AV290+Ethyl bromide |
| 10 | 5/5 | 4/5 |
| 5 | 4/5 | 0/5 |
| 2.5 | 2/5 | 0/5 |
| 1.2 | 0/5 | 0/5 |
| | Antibiotic AV290 | AV290+Ethyl iodide |
| 10 | 10/10 | 10/10 |
| 5 | 9/10 | 10/10 |
| 2.5 | 3/10 | 4/10 |
| 1.2 | 1/10 | 6/10 |
| | Antibiotic AV290 | AV290+m-Nitrobenzyl bromide |
| 10 | 10/10 | 10/10 |
| 5 | 9/10 | 4/10 |
| 2.5 | 3/10 | 0/10 |
| 1.2 | 1/10 | 0/10 |
| Infected nontreated controls | 78/80 Mice died within one day after infection | |

I claim:
1. The product of the reaction of antibiotic AV290 with methyl bromide, a compound which
   a. is effective in inhibiting the growth of bacteria; and in its essentially pure crystalline form
   b. has the following elemental analysis (percent): C, 45.96; H, 5.00; N, 5.29; Cl, 3.08; Br, 9.53; and
   c. has a characteristic infrared absorption spectrum as shown in FIG. 1 of the drawings.
2. The product of the reaction of antibiotic AV290 with methyl iodide, a compound which
   a. is effective in inhibiting the growth of bacteria; and in its essentially pure crystalline form
   b. has the following elemental analysis (percent): C, 45.20; H, 4.86; N, 5.42; Cl, 3.46; I, 15.08; and
   c. has a characteristic infrared absorption spectrum as shown in FIG. 2 of the drawings.
3. The product of the reaction of antibiotic AV290 with ethyl iodide, a compound which
   a. is effective in inhibiting the growth of bacteria; and in its essentially pure crystalline form
   b. has the following elemental analysis (percent): C, 35.43; H, 3.88; N, 4.33; Cl, 3.30; I, 10.67; and
   c. has a characteristic infrared absorption spectrum as shown in FIG. 3 of the drawings.

\* \* \* \* \*